US000001397H

United States Statutory Invention Registration [19]

[11] Reg. Number: H1397

Plichta et al.

[43] Published: Jan. 3, 1995

[54] CATHODE MATERIAL FOR USE IN A HIGH TEMPERATURE RECHARGEABLE MOLTEN SALT CELL AND HIGH TEMPERATURE RECHARGEABLE MOLTEN SALT CELL INCLUDING THE CATHODE MATERIAL

[75] Inventors: Edward J. Plichta, Howell; Wishvender K. Behl, Ocean, both of N.J.

[73] Assignee: The United States of America as represented by the Secretary of the Army, Washington, D.C.

[21] Appl. No.: 1,687

[22] Filed: Jan. 7, 1993

[51] Int. Cl.[6] ..... H01M 6/00

[52] U.S. Cl. ..... 429/122; 429/218; 429/199

[58] Field of Search ..... 204/291, 243 R; 429/12, 429/112, 199, 218, 122

[56] References Cited

U.S. PATENT DOCUMENTS 3,898,096 8/1975 Heredy et al. ..... 429/103

*Primary Examiner*—Robert L. Stoll
*Assistant Examiner*—Joseph D. Anthony
*Attorney, Agent, or Firm*—Michael Zelenka; Roy E. Gordon

[57] ABSTRACT

Binary sulfides of chromium of the formula $Cr_2S_3$, $Cr_3S_4$, and CrS are used as the cathode in a high temperature molten rechargeable salt cell. The cathode material is thermally stable at high temperatures and also provides high specific energy densities and specific power densities to that the cell can be used in pulse power, electric propulsion and load leveling applications.

11 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CATHODE MATERIAL FOR USE IN A HIGH TEMPERATURE RECHARGEABLE MOLTEN SALT CELL AND HIGH TEMPERATURE RECHARGEABLE MOLTEN SALT CELL INCLUDING THE CATHODE MATERIAL

GOVERNMENT INTEREST

The invention described herein may be manufactured, used, and licensed by or for the Government for governmental purposes without the payment to us of any royalties thereon.

BACKGROUND OF THE INVENTION

I. Field of the Invention

This invention relates in general to a cathode material for use in a high temperature rechargeable molten salt cell and to a high temperature rechargeable molten salt cell including said cathode material, and in particular, to a cathode material including binary sulfides of chromium of the formula $Cr_2S_3$, $Cr_3S_4$, and CrS and to a high temperature rechargeable molten salt cell including said cathode material.

II. Description of the Prior Art

High temperature rechargeable molten salt cells have been required for electric propulsion, load leveling and pulse power applications. Amongst them any molten salt battery systems that have been studied over the past years, the lithium alloy/metal sulfide cell has shown considerable promise for these applications. Theretofor, these cells have used a lithium alloy (LiAl) as the anode, an electrolyte including a molten lithium halide mixture and a cathode including as the cathode active material a transition metal sulfide compound of group VIII having the general formula MS or $MS_2$ where M is either Fe, Co, or Ni.

SUMMARY OF THE INVENTION

The general object of this invention is to provide an improved high temperature rechargeable molten salt cell. A more particular object of the invention is to provide such a cell that includes an active cathode material that is thermally stable at high temperatures and that also provides high specific energy densities and specific power densities for use in pulse power, electric propulsion and load leveling applications.

It has now been found that the aforementioned objects can be attained by providing a molten salt electrochemical cell wherein the active cathodic materials are sulfides of chromium $Cr_2S_3$, $Cr_3S_4$ and CrS. Use of these materials as cathodes is an electrochemical cell including Li-Al alloy as the anode, and molten LiBr-LiCl-LiF as the electrolyte has been demonstrated to deliver specific energy densities of about 288 Wh/kg at a current density of 20mA/cm$^2$.

DESCRIPTION OF THE PREFERRED EMBODIMENT

The electrochemical cell described here uses a lithium-aluminum (48 atomic percent lithium) alloy as the anode, an all lithium halide electrolyte including a mixture of lithium bromide (47 mole percent), lithium chloride (31 mole percent), and lithium fluoride (22 mole percent) with a melting point of 445° C. and a cathode including a mixture of chromium metal (25 mole percent) and lithium sulfide (75 mole percent). The electrochemical cell includes a three pellet stack of an anode, an electrolyte with separator, and a cathode. An 0.255 gram cathode pellet includes a mixture of 31 weight percent of −200 mesh chromium metal powder, 54 weight percent lithium sulfide and 15 weight percent all lithium halide electrolyte pressed to 1000 pounds pressure in a ½ inch diameter steel die.

A separator pellet is made by pressing an 0.253 gram mixture of the all lithium halide electrolyte (65 weight percent) and magnesium oxide (35 weight percent) in a ½ inch diameter steel die to 1000 pounds pressure. The anode pellet is similarly prepared by pressing an 0.306 gram mixture of lithium-aluminum alloy powder (65 weight percent) and all lithium halide electrolyte (35 weight percent) in the ½ inch diameter steel die to a pressure of 1000 pounds. The three pressed pellets are stacked as anode, separator and cathode and are placed in a ½ inch diameter steel die and are pressed to a total pressure of 4000 pounds. The pressed cell stack is placed into a ½ inch diameter ⅜ inch high boron nitride bushing that is used to guard against edge shorting. The pellet stack is held in compression through the use of a spring loaded assembly affixed with molybdenum metal disks on each side of the cell stack to act as current collectors. The spring loaded assembly is placed into a Pyrex vessel that enables the cell to be operated over an anhydrous flowing argon atmosphere. Electrical feed through connections through the top of the Pyrex vessel provide electrical connection to the positive and negative terminals of the cell.

The cell is assembled in the discharged or electrochemically reduced state and shows an open circuit potential of 0.85 volts at the operating temperature of 490° C. The cell is then charged to a voltage limit of 1.55 V. Upon charging, chromium metal reacts with lithium sulfide in three successive steps to form chromium (II) sulfide (CrS), chromium (II, III) sulfide ($Cr_3S_4$) and chromium sesquisulfide ($Cr_2S_3$) in the cathode structure. During charging, the lithium ions are transported through the all lithium halide electrolyte and are deposited on the lithium aluminum alloy anode.

DESCRIPTION OF THE DRAWING

Referring to FIG. 1, it is seen that the discharge curves exhibit three voltage plateaus at a current density of 25mA/cm$^2$ that are found to occur at 1.3, 1.1 and 0.94 V, respectively.

Figure 1:
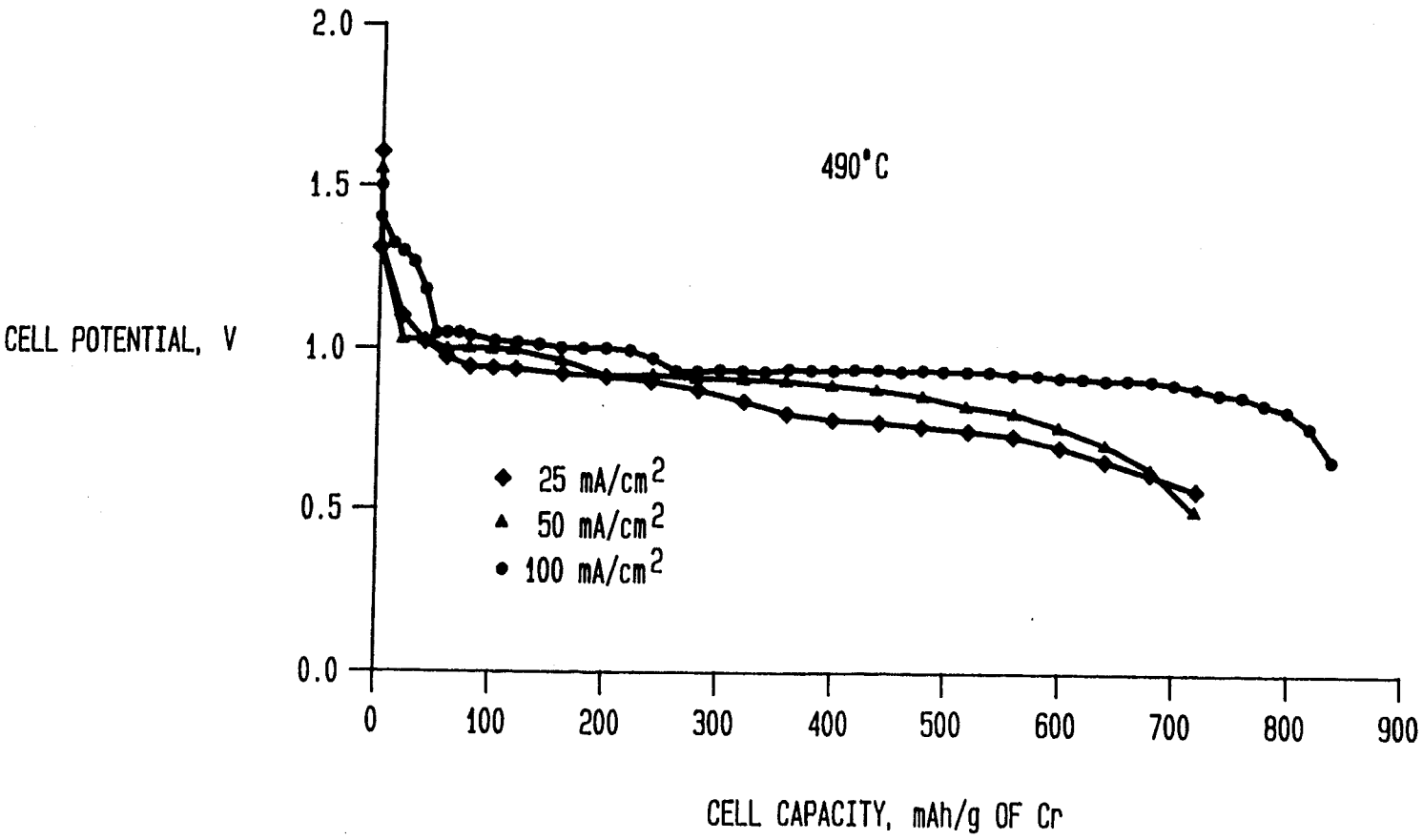
FIG. 1 is a showing of the discharge curves obtained when the fully charged cell is discharged at successive current densities of 25,50 and 100 mA/cm$^2$.

The three voltage plateaus may be attributed to the successive reduction of $Cr_2S_3$ to $Cr_3S_4$, CrS, and Cr respectively, according to the equations:

$$3Cr_2S_3+2LiAl \rightarrow 2Cr_3S_4+Li_2S+2Al$$

$$2Cr_3S_4+4LiAl \rightarrow 6CrS+2Li_2S+4Al$$

$$6CrS+12LiAl \rightarrow 6Cr+6Li_2S+12Al$$

Discharge at the higher current densities results in the plateau voltages being lower than those obtained at current density of 25mA/cm$^2$ due to an increase of polarization through the electrolyte. The average cell voltage during discharge at 25 mA/cm$^2$ is found to be 1.25 V. Based upon the weight of the cathode reactants, the cell delivers an energy density of 288 Wh/kg. The theoretical energy density for the cell for an average cell voltage of 1.25 V is calculated to be 1004 Wh/kg.

Other variations are seen as coming within the scope of the invention. For example, the alkali metal ion containing anode may be at least one member of the group of lithium, lithium-aluminum alloys, sodium, sodium-lead alloys, potassium, calcium, and magnesium. The molten alkali metal halide electrolyte may be at least one member of the group of $LiAlCl_4$, $NaAlCl_4$, LiCl, LiF, LiBr, NaCl, NaF, NaBr, KCl, KF and KBr. A particular molten alkali metal halide electrolyte includes a eutectic mixture of 47 mole percent lithium bromide, 31 mole percent lithium chloride and 22 mole percent lithium fluoride. Another particular electrolyte includes a eutectic mixture of 59 mole percent lithium chloride and 41 mole percent potassium chloride.

The chromium sulfide cathode includes at least one member of the group $Cr_2S_3$, $Cr_3S_4$, and CrS. The chromium sulfide cathode may be made in situ by electrochemically oxidizing a mixture of chromium metal and an alkali metal sulfide such as $Li_2S$, $Na_2S$, and $K_2S$. The chromium sulfide cathode can also be made in situ by electrochemically oxidizing a mixture of chromium metal and sulfur.

A particularly desirable high temperature rechargeable molten salt cell according to the invention includes a lithium aluminum alloy (48 atomic percent lithium) as the anode, a lithium halide eutectic mixture of lithium chloride (31 mole percent), lithium bromide (47 mole percent) and lithium fluoride (22 mole percent) with a melting point of 445° C. as the electrolyte, and a mixture of chromium metal (25 mole percent) and lithium sulfide (75 mole percent) as the cathode where the cell is activated by electrically charging the cell to a cell voltage limit of abut 1.6 V at a temperature above the melting point of the electrolyte.

We wish it to be understood that we do not desire to be limited to the exact details of construction as described for obvious modifications will occur to a person skilled in the art.

What is claimed is:

1. A cathode material for use in high temperature rechargeable molten salt-cells, said cathode material including binary sulfides of chromium of the formula $Cr_2S_3$, $Cr_3S_4$, and CrS.

2. A high temperature rechargeable molten salt cell including a lithium aluminum alloy of about 48 atomic percent lithium as the anode, a lithium halide eutectic mixture of about 31 mole percent of molten lithium chloride, about 47 mole percent of molten lithium bromide, and about 22 mole percent of molten lithium fluoride with a melting point of about 445° C. as the electropyte, and a mixture of about 25 mole percent of chromium metal and about 75 mole percent of lithium sulfide as the cathode, wherein the cell is in an electrochemically reduced state and is activated to form the $Cr_2S_3$, $Cr_3S_4$, and CrS cathode material by electrically charging the cell to a cell voltage limit of about 1.6 V at a temperature above the melting point of the electrolyte.

3. A high temperature rechargeable molten salt cell including an alkali metal ion containing anode, a molten alkali metal halide electrolyte and binary sulfides of chromium as the cathode.

4. A high temperature rechargeable molten salt cell according to claim 3 wherein the binary sulfides of chromium are $Cr_2S_3$, $Cr_3S_4$, and CrS.

5. A high temperature rechargeable molten salt cell according to claim 3 wherein the chromium sulfide cathode is formed insitu by the electrochemical oxidation of chromium metal and an alkali metal sulfide of the group consisting of $Li_2S$, $Na_2S$ and $K_2S$.

6. A high temperature rechargeable molten salt cell according to claim 3 wherein the chromium sulfide cathode is formed insitu by the electrochemical oxidation of a mixture of chromium metal and sulfur.

7. A high temperature rechargeable molten salt cell according to claim 3 wherein the alkali metal containing anode is at least one member taken from the group consisting of lithium, lithium-aluminum alloys, lithium-boron alloys, sodium, solium-lead alloys, potassium, calcium, and magnesium.

8. A high temperature rechargeable molten salt cell according to claim 7 wherein the anode is a lithium aluminum alloy of about 48 atomic percent lithium.

9. A high temperature rechargeable molten salt cell according to claim 3 wherein the molten alkali metal halide electroylte is at least one molten alkali metal halide taken from the group consisting of molten $LiAlCl_4$, molten $NaAlCl_4$, molten LiCl, molten LiF. molten LiBr, molten NaCl, molten NaF, molten NaBr, molten KCl, molten KF, and molten KBr.

10. A high temperature rechargeable molten salt cell according to claim 9 wherein the molten alkali metal halide electrolyte is a eutectic mixture of about 47 mole percent of molten lithium bromide, about 31 mole percent of molten lithium chloride, and about 22 mole percent of molten lithium fluoride.

11. A high temperature rechargeable molten salt cell according to claim 9 where the molten alkali metal halide electrolyte is a eutectic mixture of about 59 mole percent of molten lithium chloride and about 41 mole percent of molten potassium chloride.

* * * * *